(12) United States Patent
Manning

(10) Patent No.: US 11,157,788 B2
(45) Date of Patent: Oct. 26, 2021

(54) TWO-DIMENSIONAL MARKER FOR MARKING AN OBJECT, METHOD AND SYSTEM FOR GENERATING THE MARKER, METHOD AND SYSTEM FOR GENERATING A MARKER CODE, AND METHOD AND SYSTEM FOR AUTHENTICATING AN OBJECT

(71) Applicant: ORBID Limited, County Clare (IE)

(72) Inventor: Mark Manning, Redwood City, CA (US)

(73) Assignee: ORBID LIMITED, County Clare (IE)

( * ) Notice: Subject to any disclaimer, the term of this patent is extended or adjusted under 35 U.S.C. 154(b) by 92 days.

(21) Appl. No.: 16/498,429

(22) PCT Filed: Mar. 28, 2018

(86) PCT No.: PCT/EP2018/057931
§ 371 (c)(1),
(2) Date: Sep. 27, 2019

(87) PCT Pub. No.: WO2018/178158
PCT Pub. Date: Oct. 4, 2018

(65) Prior Publication Data
US 2021/0089850 A1  Mar. 25, 2021

(30) Foreign Application Priority Data

Mar. 30, 2017 (NL) ..................... 2018613

(51) Int. Cl.
*G06K 19/06* (2006.01)

(52) U.S. Cl.
CPC . *G06K 19/06037* (2013.01); *G06K 19/06046* (2013.01)

(58) Field of Classification Search
CPC .................. G06K 19/06037; G06K 19/06046
See application file for complete search history.

(56) References Cited

U.S. PATENT DOCUMENTS

| | | | |
|---|---|---|---|
| 6,565,002 B1 | 5/2003 | Tel | |
| 2005/0133584 A1* | 6/2005 | Finnerty | G06K 19/14 235/375 |
| 2010/0151213 A1* | 6/2010 | Smithson | B60R 13/10 428/195.1 |
| 2011/0303748 A1 | 12/2011 | Lemma | |
| 2013/0233914 A1* | 9/2013 | Lillard, Jr. | B65D 1/265 235/375 |
| 2015/0286481 A1* | 10/2015 | Walker | G06F 16/9038 235/375 |
| 2016/0342885 A1* | 11/2016 | Toedtli | G06K 7/1452 |
| 2017/0035527 A1* | 2/2017 | Whitton | G01R 33/58 |
| 2018/0018038 A1* | 1/2018 | Huang | H03K 17/975 |

* cited by examiner

Primary Examiner — Sonji N Johnson
(74) Attorney, Agent, or Firm — Browdy and Neimark, P.L.L.C.

(57) ABSTRACT

A two-dimensional marker (40) for marking an object comprises a plurality of line segments (40a, 40b, 40c, 40d) each extending between a first end point and a second end point thereof, wherein at least one of the line segments comprises a shape of at least one period of a periodic waveform.

20 Claims, 7 Drawing Sheets

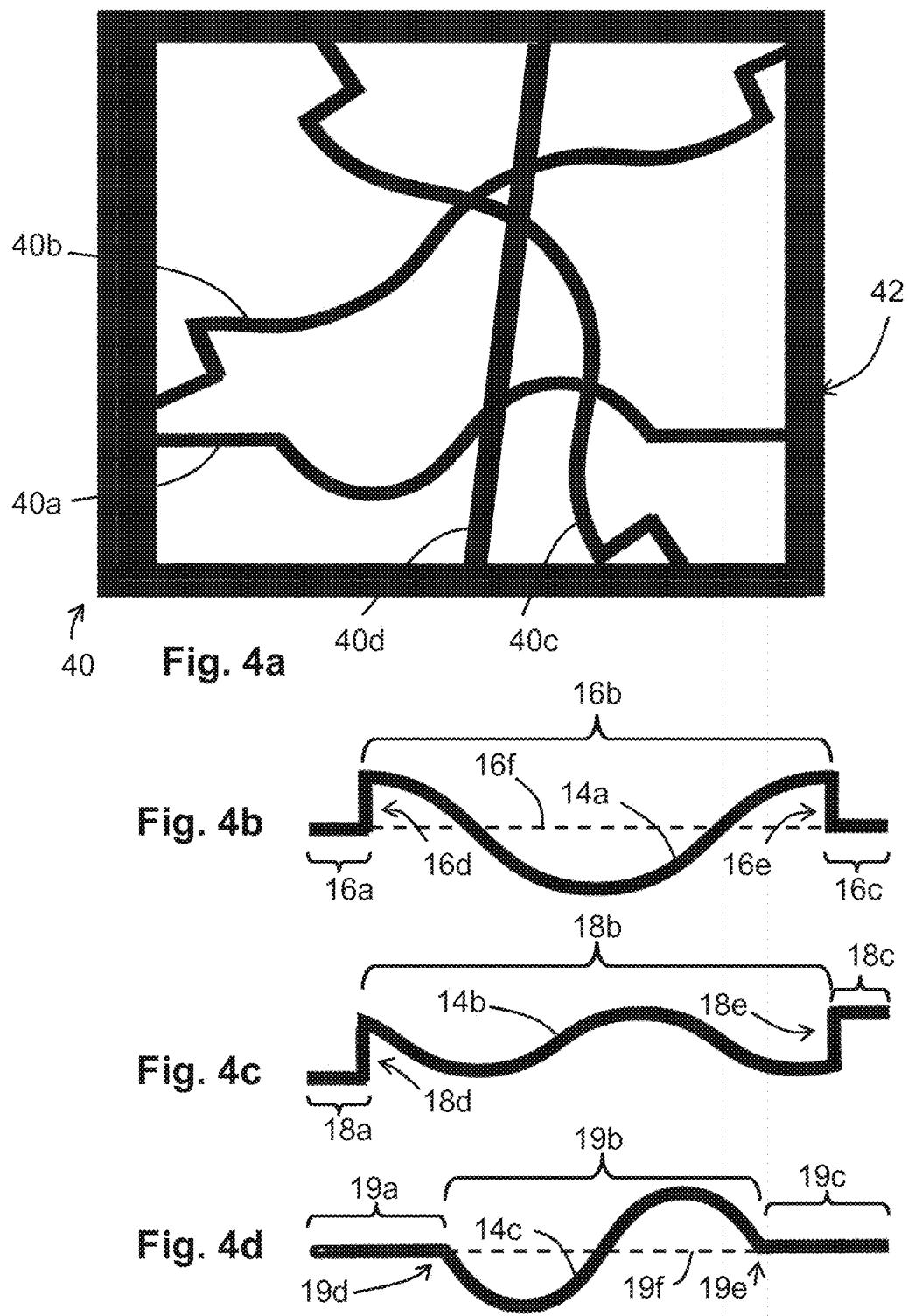

TWO-DIMENSIONAL MARKER FOR MARKING AN OBJECT, METHOD AND SYSTEM FOR GENERATING THE MARKER, METHOD AND SYSTEM FOR GENERATING A MARKER CODE, AND METHOD AND SYSTEM FOR AUTHENTICATING AN OBJECT

FIELD OF THE INVENTION

The invention relates to the field of marking, in particular marking of objects with two-dimensional markers for the purpose of identification and authentication of the objects. In particular, the marker comprises a plurality of line segments each extending between a first end point and a second end point thereof.

BACKGROUND OF THE INVENTION

With many products, in particular products offered by well-known companies having a high reputation and brand value, a problem of grey markets and counterfeiting occurs. Grey markets cause a high loss of revenues for the original manufacturers, hurts their distributors and retailers, erodes margins at every level, impacts the brand's prestige, and may even fund terrorism. Likewise, counterfeiting creates financial loss and brand damage, increased liability from counterfeit failure, may cause injury and death to unsuspecting customers, and also may fund terrorism.

There is a need to mark certain items to allow for identification and authentication, and to avoid counterfeiting. In the prior art, objects where identified by use of a barcode or a dot code, where the codes can be directly provided on the surface of the object. Both barcodes and dot codes provide a limited number of mutually different identification codes within reasonable dimensions. For this reason, these codes are unsuitable for uniquely characterizing large quantities of objects, when the surface for the application of the barcode or dot code is relatively small.

First reference U.S. Pat. No. 6,565,002 B1 discloses a method and system for identifying one or more objects. A two-dimensional, optically readable pattern of straight lines, and an identification code are generated. The pattern and the identification code are paired in one-to-one correspondence by means of a predetermined algorithm, and are arbitrary. A two-dimensional representation of the pattern is provided on the object or on a pattern support connected thereto. The identification code is stored together with associated identification information. In order to identify the object, the representation of the pattern thereof is optically scanned and the associated identification code is determined, by means of which the identification information can be determined.

The two-dimensional pattern according to the first reference can be quite small, more particularly considerably smaller than the usual barcodes and dot codes, yet still may provide the same or a higher quantity of different identification codes. The pattern is optically readable, and therefore the objects or pattern supports connected thereto carrying the pattern can be scanned, and hereby the associated identification code can be determined.

In the application according to the first reference, the two-dimensional pattern consists of arbitrarily oriented straight lines that have a one-on-one relationship to a code. Thus, the code is vector-based. The code may contain user information, such as serial number or manufacturing details, or may be an indicator of such user information. The generating and reading of the two-dimensional pattern may be secure, wherein only a user applying a specific encryption/decryption algorithm is able to create or read the pattern.

Second reference US 2011/0303748 A1 discloses a method and apparatus for data encoding and optical recognition of encoded data including generating symbols that represent data using angles, rather than linear dimensions as used for conventional bar codes. One embodiment uses spirals isocurves, including spiral lines radiating out from a central origin, each having a constant symbol angle with a concentric circle at an arbitrary point of the spiral line. Another embodiment uses parabolas isocurves. Each symbol may represent a data element, such as a character. A plurality of symbols thus can represent a word or code, if it is predefined in which order the symbols are to be interpreted.

There is a need for providing additional data in a code of a marker having a line pattern, for example to enable a manufacturer to provide unique markers on its products even if these products are manufactured in large quantities and/or varieties.

Additional data could be added to the existing vector-based code by adding lines to the pattern, but this has significant drawbacks in that it increases the size of the pattern and reduces contrast by obscuring more of the background, i.e. the surface area of the pattern not covered by the lines. This is undesirable.

As another option of adding additional data, several two-dimensional patterns might be stacked. However, this also has a significant drawback of increasing the footprint of the marker, which is also undesirable.

SUMMARY OF THE INVENTION

It would be desirable to provide an alternative marker and associated methods and systems for using it. It would also be desirable to provide a marker, and associated methods and systems for using it, the marker allowing to store an increased amount of information, in particular unique information for every marker. It would also be desirable to provide a marker, and associated methods and systems for using it, which marker can have a small size and high contrast.

To better address one or more of these concerns, in a first aspect of the invention a two-dimensional marker for marking an object is provided, wherein the marker comprises a plurality of line segments each extending between a first end point and a second end point thereof, and wherein at least one of the line segments comprises a shape of at least one period of a periodic waveform.

Herein, the term marker is to indicate at least a part of a substrate provided with a pattern of line segments, at least one of which at least partly has a shape of at least one period of a periodic waveform. The pattern may be provided on a surface of the part of the substrate, where the substrate is the object, or a marker support to be connected to the object, or a part of the object or the marker support. The substrate may be made from any material, such as a natural material, paper, plastic, metal, ceramics, glass, and other materials. The pattern may also be provided below a surface of the part of the substrate, as long as it can be scanned to obtain the pattern. As an example, the pattern may be applied below the surface of a transparent material, where the marker can be optically scanned from outside the material. As another example, the pattern may be applied below the surface of a material to be electro-magnetically scannable from outside the material.

The marker according to the invention is based on the insight that, with a same number of line segments, it is possible to store considerably more information in the marker than in a case of having only straight line segments in the marker, by forming one or more of the line segments of the marker at least partly in a shape of at least one period of a periodic waveform. Unique properties of the periodic waveform then advantageously can be used to store information, in other words, to increase the data content of the marker. At the same time, the number of line segments does not need to be increased, so that an optical contrast of the line segments with respect to a background of the marker, i.e. the space of the marker not occupied by line segments, may virtually remain the same.

A periodic waveform may be associated with an imaginary straight reference line, wherein the periodic waveform has, or can be considered to have, at least two, or at least three, intersections with the reference line for one period of the periodic waveform. In the case of two intersections, such intersections will be within the period. In the case of at least three intersections, there is one intersection at a start of a period, one intersection at an end of a period, and at least one intersection between the start of a period and the end of a period.

Periodic waveforms have advantages over other shapes. A periodic waveform can be generated and analyzed based on well-developed rules of arithmetic, including Fourier analysis and transformations, and may be constituted by a limited number of variables that can have many different values.

Useful properties of the periodic waveform are periodicity and/or amplitude and/or phase angle, which can be varied to represent a large amount of different data. Depending on the number of line segments of the marker, the amount of data may be multiplied by that number.

A period of the periodic waveform can be determined, e.g. as a distance or length between an intersection point of the periodic waveform and the reference line at a start of a period, and an intersection point of the periodic waveform and the reference line at an end of a period, the distance or length being taken along said reference line. An amplitude of the periodic waveform can also be determined, as a distance or length, or a maximum distance or length, at right angles to the reference line, between the periodic waveform and the reference line. A phase angle can also be determined, as a distance or length in relation to a distance or length being equivalent to a period of the periodic waveform, the distance or length representing the phase angle being taken along said reference line.

In an embodiment of the marker, the at least one line segment comprising a shape of at least a period of a periodic waveform is associated with a periodicity being one of a plurality of periodicities, comprising at least a first periodicity and a second periodicity being different from each other. The first periodicity preferably is an integer multiple of the second periodicity to reach a high degree of discrimination between different periodicities.

Alternatively, or additionally, in an embodiment of the marker, the at least one line segment comprising a shape of at least a period of a periodic waveform is associated with an amplitude being one of a plurality of amplitudes, comprising a least a first amplitude and a second amplitude being different from each other. The first amplitude preferably is an integer multiple of the second amplitude to reach a high degree of discrimination between different amplitudes.

Alternatively, or additionally, in an embodiment of the marker, the at least one line segment comprising a shape of at least a period of a periodic waveform is associated with a phase angle being one of a plurality of phase angles, comprising a least a first phase angle and a second phase angle being different from each other. The first phase angle preferably is an integer multiple of the second phase angle to reach a high degree of discrimination between different phase angles.

In addition, useful properties of the periodic waveform are a variation of a location or relative location of the first end point and the second end point of the marker, which also represents a large amount of different data. Depending on the number of line segments of the marker, the amount of data is multiplied by that number.

In an embodiment of the marker, the first end points of the line segments do not coincide, and/or the second end points of the line segments do not coincide, whereby the locations of the first and second end points are varied to a high degree. Yet, when scanning such a marker, each line segment may be recognized relatively easy by image recognition software, since ambiguity of to which line segment a first end point or second end point belongs, is avoided.

In general, in an embodiment of the marker, each first end point is located at one of a plurality of predetermined positions, and/or each second end point is located at one of a plurality of predetermined positions. The predetermined positions may be such that a first end point and a second end point of a line segment does not coincide with any first or second end point of any other line segment of the marker.

In an embodiment of the marker, the first end points and/or the second end points of the line segments are located on a real or virtual edge line comprising edge line segments. Herein, a virtual edge line is not visible in the marker, and thus is imaginary. By contrast, a real edge line is visible in the marker. The edge line may have a polygon shape, such as a rectangle, in particular a regular polygon shape, such as a square, wherein an edge line segment is a side of the polygon shape.

Preferably, the first end points of the line segments are located on one of the edge line segments, and the second end points of the line segments are located on another one of the edge line segments. Preferably, the one of the edge line segments is opposite to the other one of the edge line segments, where each edge line segment is straight. Here, the term 'opposite' is to be taken as meaning 'extending at an angle of less than 90° to the other one'.

For a simple and effective recognition of an orientation of a marker, in an embodiment the marker comprises an edge line segment having a line width being different from another edge line segment, in particular an edge line segment having a greater line width than the other edge line segments. Advantageously, the edge line segment having the different line width sets a reference for a coordinate system to define positions and/or vectors determining the line segments of the marker, such as first and second end points, and shape.

In an embodiment of the marker, the periodic waveform is a sinusoidal waveform, or a square waveform, or a triangular waveform. Also, the periodic waveform may be a compounded waveform comprising an addition of at least two sinusoidal waveforms, where the number of sinusoidal waveforms will have an upper limit determined by the possibility to discriminate, e.g. optically or electro-magnetically, between the number of sinusoidal waveforms and/or between different line segments each having the shape of a compounded waveform.

In an embodiment of the marker having the shape of a compounded waveform, the at least two sinusoidal waveforms are phase-shifted with respect to each other. Here, the sinusoidal waveforms may have the same or different periodicity and/or the same or different amplitude with respect to each other.

As explained above, a specific marker comprising a specific number of specific line segments each extending between a first end point and a second end point thereof, and at least one of the line segments at least partly having a shape of at least one period of a periodic waveform, can correspond to a specific marker code, where there may be a one-to-one relationship between the marker and the marker code. This relationship can be used to advantage in the generation of the marker for a specific object from a marker code, which in turn may have been generated from an object code (i.e. a code comprising object data relating to the object).

Accordingly, in a second aspect of the invention, a method of generating a marker of the present invention is provided, wherein the marker is to be associated with an object. The method comprises the steps of:

receiving object data corresponding to the object,
converting the object data into a marker code; and
generating a marker image based on the marker code, wherein the marker is based on the marker image, and comprises a plurality of line segments each extending between a first end point and a second end point thereof, wherein at least one of the line segments comprises a shape of at least one period of a periodic waveform,
wherein the object data, the marker code, the marker image and the marker have a one-to-one relationship.

The object data comprise at least one of object identification data, and object manufacturing data. Object identification data may relate to an object identification number or an object serial number, or other identification data. Object manufacturing data may relate to a manufacturing plant, a manufacturing department, a manufacturing address, a manufacturing date, or other manufacturing data.

In an embodiment of the method, the step of converting the object data into a marker code comprises encrypting the object data to obtain an encrypted marker code, and wherein the step of generating the marker image is based on the encrypted marker code. With the encryption of the object data, it is impossible or at least very difficult for a malicious party to retrieve the object data from a known marker code.

Based on the marker image, in an embodiment of the method the marker is applied to an object or an associated marker support to be connected to the object. The step of applying the marker may comprise printing the marker on the object or an associated marker support to be connected to the object, or may comprise engraving the marker on or in the object or an associated marker support to be connected to the object.

The one-to-one relationship between the marker and the marker code can further be used to advantage in the generation of a marker code from a marker, wherein from the marker code in turn an object code (i.e. a code comprising object data relating to the object) may be generated.

Accordingly, in a third aspect of the present invention, a method of generating object data corresponding to an object being associated with a marker according to the invention is provided. The method comprises the steps of:

receiving a marker image obtained by scanning the marker, wherein the marker comprises a plurality of line segments each extending between a first end point and a second end point thereof, wherein at least one of the line segments comprises a shape of at least one period of a periodic waveform;

generating a marker code based on the marker image; and
converting the marker code into object data,
wherein the object data, the marker code, the marker image and the marker have a one-to-one relationship.

In an embodiment of the method, the marker is an optically readable marker, and the scanning of the marker comprises optical scanning.

In an embodiment of the method, the marker code is an encrypted marker code, and the step of converting the marker code into object data comprises decrypting the encrypted marker code to obtain the object data. With the encryption of the marker code, it is impossible or at least very difficult for a malicious party to retrieve the object data from a known marker code.

In the methods according to the second and third aspects, the marker code comprises a plurality of marker code segments each defining a property of a line segment, based on predefined relationships between variations in marker code segments and variations in properties of line segments. The property of a line segment is selected from a group of properties comprising:

a first end point of the line segment;
a second end point of the line segment;
a periodicity of the line segment;
an amplitude of the line segment; and
a phase angle of at least a part of the line segment.

As explained above, a specific marker comprising a specific number of specific line segments each extending between a first end point and a second end point thereof, and at least one of the line segments having a shape of at least a part of a periodic waveform, can correspond to a specific marker code, where there may be a one-to-one relationship between the marker and the marker code. This relationship can be used to advantage in the identification and authentication of objects associated with the marker.

Accordingly, in a fourth aspect of the present invention, a method of identifying and/or authenticating an object is provided, the object being associated with a marker according to the invention. The method comprises the steps of:

receiving a marker image obtained by scanning the marker, wherein the marker comprises a plurality of line segments each extending between a first end point and a second end point thereof, wherein at least one of the line segments comprises a shape of at least one period of a periodic waveform;

generating a marker code based on the marker image, wherein the marker code, the marker image, and the marker have a one-to-one relationship; and comparing the generated marker code with each one of a set of authenticated marker codes and, if the generated marker code is found to be identical to one of the authenticated marker codes, designating the object as being identified and/or authentic.

Further accordingly, in a fifth aspect of the present invention, a method of identifying and/or authenticating an object is provided, the object being associated with a marker according to the invention. The method comprises the steps of:

receiving a marker image obtained by scanning the marker, wherein the marker comprises a plurality of line segments each extending between a first end point and a second end point thereof, wherein at least one of the line segments comprises a shape of at least one period of a periodic waveform;

generating a marker code based on the marker image;

converting the marker code into object data, wherein the object data, the marker code, the marker image and the marker have a one-to-one relationship; and comparing at least part of the object data with each one of a set of authenticated object data and, if the at least part of the object data is found to be identical to one of the authenticated object data, designating the object as being identified and/or authentic.

In further aspects of the invention, systems are provided to perform the methods of the invention.

These and other aspects of the invention will be more readily appreciated as the same becomes better understood by reference to the following detailed description and considered in connection with the accompanying drawings in which like reference symbols designate like parts.

BRIEF DESCRIPTION OF THE DRAWINGS

FIG. 4a depicts another embodiment of a marker according to the invention, comprising line segments representing sinusoidal waveforms having different amplitudes, different periodicities and different phase angles.

FIGS. 4b to 4d respectively depict shapes of line segments having a sinusoidal waveform and having different amplitudes, different periodicities and different phase angles.

DETAILED DESCRIPTION OF EMBODIMENTS

Figure 1:
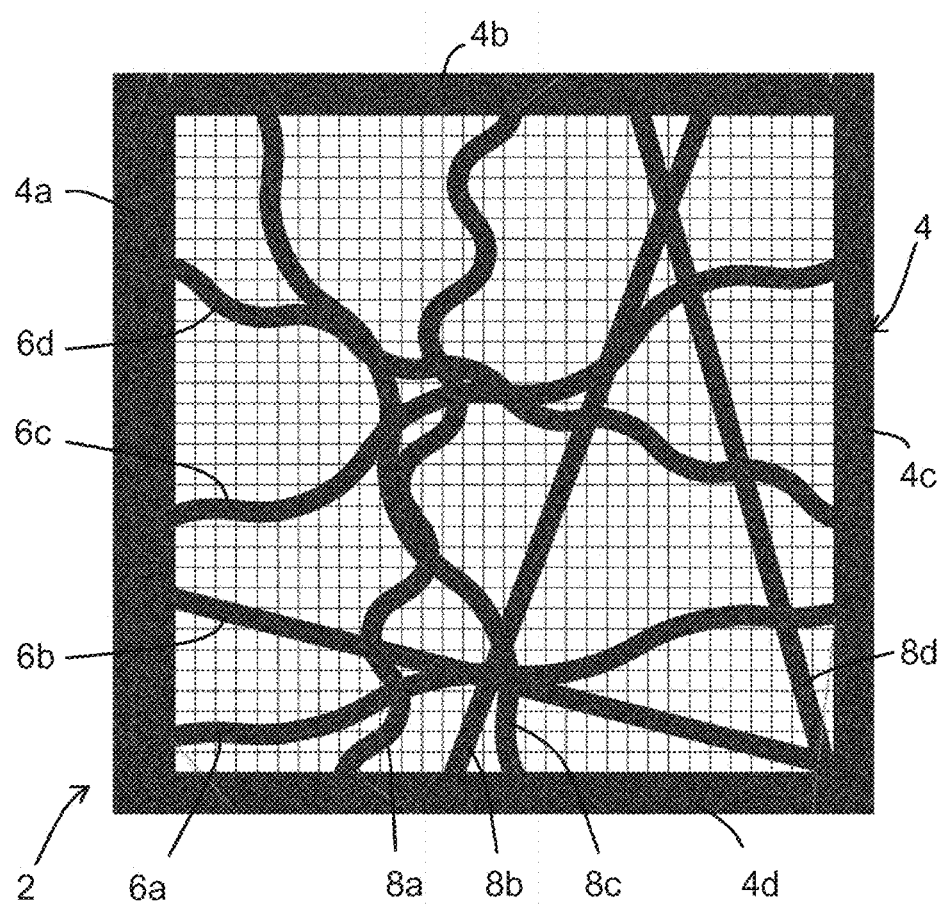
FIG. 1 depicts an embodiment of a marker according to the invention, with a grid added thereto for locating positions of first and second end points of line segments.

FIG. 1 depicts an embodiment of a two-dimensional marker 2 for marking an object.

The marker 2 is applied to a substrate, i.e. applied on or in a substrate, or part thereof. The substrate is an object or part or component part thereof, or may be a marker support to be connected to the marker 2.

The marker 2 comprises an edge line 4. The edge line 4 represents a polygon and thus has a polygon shape, in this case a rectangle, in particular a square, having four edge line segments 4a, 4b, 4c, 4d, wherein adjacent edge line segments 4a, 4b, as well as 4b, 4c, as well as 4c, 4d, as well as 4d, 4a include a right angle. Each one of the line segments 4a, 4b, 4c, 4d is a side of the polygon. The edge line segment 4a has a line width being different from any of the other edge line segments 4b, 4c, 4d. In particular, the edge line segment 4a has a greater line width than the other edge line segments 4b, 4c, 4d.

A plurality of line segments 6a, 6b, 6c, 6d each extend between a respective first end point thereof located on one edge line segment 4a and a respective second end point thereof located on an opposite edge line segment 4c. A plurality of line segments 8a, 8b, 8c, 8d each extend between a respective first end point thereof located on one edge line segment 4b and a respective second end point thereof located on an another, opposite edge line segment 4d. Accordingly, the first end points and the second end points of the line segments 6a, 6b, 6c, 6d, 8a, 8b, 8c, 8d are located on an edge line 4 comprising at four edge line segments 4a, 4b, 4c, 4d.

Within the edge line 4, a grid 10 is shown for to be able to indicate and explain positions, or locations, or coordinates of first end points and second end points of the line segments 6a, 6b, 6c, 6d, 8a, 8b, 8c, 8d. Normally, in a marker according to the invention, such grid 10 is absent.

The lines of the grid 10 define squares, wherein each grid square may be thought to be represented by a pair of integer coordinates within or at the edge line 4. If the grid square at the corner defined by edge line segments 4a, 4d is indicated by coordinate pair, or coordinates, (0, 0), then the grid square at the corner defined by edge line segments 4a, 4b may be indicated by coordinates (0, 31), the grid square at the corner defined by edge line segments 4b, 4c may be indicated by coordinates (31, 31), and the grid square at the corner defined by edge line segments 4a, 4b may be indicated by coordinates (31, 0).

Then, a first end point of line segment 6a is located at coordinates (0, 1), and a second end point of the line segment 6a is located at coordinates (31, 7). A first end point of line segment 6b is located at coordinates (0, 8), and a second end point of the line segment 6b is located at coordinates (31, 0). A first end point of line segment 6c is located at coordinates (0, 12), and a second end point of the line segment 6c is located at coordinates (31, 24). A first end point of line segment 6d is located at coordinates (0, 24), and a second end point of the line segment 6d is located at coordinates (31, 12).

If a rule is applied that the first end point of the line segments 6a, 6b, 6c, 6d running between the edge line segment 4a and the edge line segment 4c is always at the edge line segment 4a, whereas the second end point is always at the edge line segment 4c, it is seen that the first end points of the line segments 6a, 6b, 6c, 6d have coordinates (0, 1), (0, 8), (0, 12) and (0, 24). Since the first coordinate is always 0 and does not play a differentiating role, the first end points of the line segments 6a, 6b, 6c, 6d may be characterized by their second coordinates 1, 8, 12 and 24 (binary: 00001, 01000, 01100 and 11000, respectively).

If a rule is applied that the second end point of the line segments 6a, 6b, 6c, 6d running between the edge line segment 4a and the edge line segment 4c is always at the edge line segment 4c, it is seen that the second end points of the line segments 6a, 6b, 6c, 6d have coordinates (31, 7), (31, 0), (31, 24) and (31, 12). Since the first coordinate is always 31 and does not play a differentiating role, the second end points of the line segments 6a, 6b, 6c, 6d may be characterized by their second coordinates 7, 0, 24 and 12 (binary: 00111, 00000, 11000 and 01100, respectively).

A first end point of line segment 8a is located at coordinates (8, 0), and a second end point of the line segment 8a is located at coordinates (16, 31). A first end point of line segment 8b is located at coordinates (13, 0), and a second end point of the line segment 8b is located at coordinates (25, 31). A first end point of line segment 8c is located at coordinates (16, 0), and a second end point of the line segment 8c is located at coordinates (4, 31). A first end point of line segment 8d is located at coordinates (31, 0), and a second end point of the line segment 8d is located at coordinates (22, 31).

If a rule is applied that the first end point of the line segments 8a, 8b, 8c, 8d running between the edge line segment 4d and the edge line segment 4b is always at the edge line segment 4d, whereas the second end point is always at the edge line segment 4b, it is seen that the first end points of the line segments 8a, 8b, 8c, 8d have coordinates (8, 0), (13, 0), (16, 0) and (31, 0). Since the second coordinate is always 0 and does not play a differentiating role, the first end points of the line segments 8a, 8b, 8c, 8d may be characterized by their first coordinates 8, 13, 16 and 31 (binary: 01000, 01101, 10000 and 11111, respectively).

If a rule is applied that the second end point of the line segments 8a, 8b, 8c, 8d running between the edge line segment 4d and the edge line segment 4b is always at the edge line segment 4b, it is seen that the second end points of the line segments 8a, 8b, 8c, 8d have coordinates (16, 31), (25, 31), (4, 31) and (22, 31). Since the second coordinate is always 31 and does not play a differentiating role, the second end points of the line segments 8a, 8b, 8c, 8d may be characterized by their second coordinates 16, 25, 4 and 22 (binary: 10000, 11001, 00100 and 10110, respectively).

In such embodiments having a predetermined range of first end point positions and a predetermined range of second end point positions, a five bit binary code suffices to determine the first end point position of a specific line segment, and a five bit binary code suffices to determine the second end point position of the specific line segment, since such first end point position and second end point position for the specific line segment can each be characterized by one out of thirty-two possible positions.

According to the embodiment of marker 2, the first end points of the line segments 6a, 6b, 6c, 6d, 8a, 8b, 8c, 8d do not coincide, and the second end points of the line segments 6a, 6b, 6c, 6d, 8a, 8b, 8c, 8d do not coincide. In other embodiments, at least some of the first end points and/or at least some of the second end points coincide. In such or other embodiments, at least one of the first end points coincides with at least one of the second end points.

In embodiments of the marker, each first end point is located at one of a plurality of predetermined positions, and/or each second end point is located at one of a plurality of predetermined positions. In the embodiment of marker 2, each first end point is located at one of a plurality of predetermined positions having coordinates (0, x) or coordinates (x, 0), wherein x may run from 0 to 31. Each second end point is located at one of a plurality of predetermined positions having coordinates (31, x) or coordinates (x, 31), wherein x may run from 0 to 31.

In other embodiments, the first end point of each line segment may be located at any one of a predetermined number of positions selected from a total number of first end point positions, and/or the second end point of each line segment may be located at any one of the predetermined number of positions selected from a total number of second end point positions. As an example, referring to the coordinate system according to FIG. 1, and having eight line segments in a marker, a first end point of a first line segment may be located at one of a plurality of predetermined positions having coordinates (0, x), wherein x may run from 0 to 7. A first end point of a second line segment may be located at one of a plurality of predetermined positions having coordinates (0, x), wherein x may run from 8 to 15. A first end point of a third line segment may be located at one of a plurality of predetermined positions having coordinates (0, x), wherein x may run from 16 to 23. A first end point of a fourth line segment may be located at one of a plurality of predetermined positions having coordinates (0, x), wherein x may run from 24 to 31. A first end point of a fifth line segment may be located at one of a plurality of predetermined positions having coordinates (x, 0), wherein x may run from 0 to 7. A first end point of a sixth line segment may be located at one of a plurality of predetermined positions having coordinates (x, 0), wherein x may run from 8 to 15. A first end point of a seventh line segment may be located at one of a plurality of predetermined positions having coordinates (x, 0), wherein x may run from 16 to 23. A first end point of an eighth line segment may be located at one of a plurality of predetermined positions having coordinates (x, 0), wherein x may run from 24 to 31.

Similarly, a second end point of a first line segment may be located at one of a plurality of predetermined positions having coordinates (31, x), wherein x may run from 0 to 7. A second end point of a second line segment may be located at one of a plurality of predetermined positions having coordinates (31, x), wherein x may run from 8 to 15. A second end point of a third line segment may be located at one of a plurality of predetermined positions having coordinates (31, x), wherein x may run from 16 to 23. A second end point of a fourth line segment may be located at one of a plurality of predetermined positions having coordinates (31, x), wherein x may run from 24 to 31. A second end point of a fifth line segment may be located at one of a plurality of predetermined positions having coordinates (x, 31), wherein x may run from 0 to 7. A second end point of a sixth line segment may be located at one of a plurality of predetermined positions having coordinates (x, 31), wherein x may run from 8 to 15. A second end point of a seventh line segment may be located at one of a plurality of predetermined positions having coordinates (x, 31), wherein x may run from 16 to 23. A second end point of an eighth line segment may be located at one of a plurality of predetermined positions having coordinates (x, 31), wherein x may run from 24 to 31.

In such embodiments having a predetermined range of first end point positions and a predetermined range of second end point positions, a three bit binary code suffices to determine the first end point position of a specific line segment, and a three bit binary code suffices to determine the second end point position of the specific line segment, since such first end point position and second end point position for the specific line segment can each be characterized by one out of only eight possible positions.

In FIG. 1, a first line segment 6a has a shape of a periodic waveform, in particular a sinusoidal waveform, having a first periodicity and a first amplitude. A second line segment 6b is a straight line, which is considered to have zero periodicity and zero amplitude. A third line segment 6c has a shape of a periodic waveform, in particular a sinusoidal waveform, having the first periodicity and a second amplitude being greater than the first amplitude. A fourth line segment 6d has a shape of a periodic waveform, in particular a sinusoidal waveform, having a second periodicity being greater than the first periodicity, and the first amplitude. A fifth line segment 8a has a shape of a periodic waveform, in particular a sinusoidal waveform, having the second periodicity and the second amplitude. A sixth line segment 8b is a straight line, which is considered to have zero periodicity and zero amplitude. A seventh line segment 8c has a shape of a periodic waveform, in particular a sinusoidal waveform, having the first periodicity and the second amplitude. An eighth line segment 8d is a straight line, which is considered to have zero periodicity and zero amplitude. In summary, the shape of each line segment 6a, 6b, 6c, 6d, 8a, 8b, 8c, 8d can be characterized by its periodicity and its amplitude, wherein the periodicity can be zero, a first periodicity and a second periodicity, and wherein the amplitude can be zero, a first amplitude and a second amplitude. Thus, in binary digits, four bits suffice to indicate a shape of a line segment in FIG. 1, wherein periodicity 00 indicates zero periodicity, periodicity 01 indicates first periodicity, periodicity 10 indicates second periodicity, amplitude 00 indicates zero amplitude, amplitude 01 indicates first amplitude, and amplitude 10 indicates second amplitude, for example.

The marker 2 of FIG. 1, comprising 8 line segments, thus may have a one-to-one relationship with a binary marker code comprising the following code segments:
line segment 6a: first end point—second end point—periodicity—amplitude: 00001—00111—01—01.
line segment 6b: first end point—second end point—periodicity—amplitude: 01000—00000—00—00.
line segment 6c: first end point—second end point—periodicity—amplitude: 01100—11000—01—10.
line segment 6d: first end point—second end point—periodicity—amplitude: 11000—01100—10—01.
line segment 8a: first end point—second end point—periodicity—amplitude: 01000—10000—10—10.
line segment 8b: first end point—second end point—periodicity—amplitude: 01101—11001—00—00.
line segment 8c: first end point—second end point—periodicity—amplitude: 10000—00100—01—10.
line segment 8d: first end point—second end point—periodicity—amplitude: 11111—10110—00—00.

Summarizing, the marker 2 may be characterized by a 112 bits binary marker code obtained by concatenating the above code segments, wherein the marker code may be: 00001001110101010000000000000110011000011011000011001001010001000010100110111001000010000001000110111111101100000.

Thus, it can be understood that the marker 2 containing line segments having different shapes of periodic waveforms, characterized by their periodicity and amplitude, extend the marker code by 8×4=32 bits compared to a marker just having straight lines having no periodicity and no amplitude.

From the marker code, and applying certain predefined marker code/marker relationship rules, the marker 2 can be generated. Inversely, from the marker 2, again applying the predefined marker code/marker relationship rules, the marker code can be generated, wherein there is a one-to-one relationship between the marker 2 and the marker code.

Different kinds of markers can be designed. Markers can have an edge line, or can be without an edge line. An edge line may comprise at least one edge line segment. If the marker has an edge line, the edge line can have a closed-line form or an open-line form (i.e. end points of the line not at the same location). The edge line may have a rounded shape, such as a circular shape, an elliptical shape, a racetrack shape, or any other rounded shape, or a part thereof. The edge line may also have a polygon shape, wherein an edge line segment is a side of the polygon shape. In FIG. 1, the edge line 4 represents a rectangle, in particular a square, but other polygon shapes are possible, such as a triangular shape, a hexagonal shape and an octagonal shape. The end points of the line segments may touch the edge line, or may be spaced from the edge line. The number of line segments in a marker can be varied. The line width of line segments can be varied, giving rise to an extended number of possible periodic waveforms, with a correspondingly extended marker code. The periodic waveform may be a compounded waveform comprising an addition of at least two sinusoidal waveforms, giving rise to a further extended number of possible periodic waveforms, with a correspondingly extended marker code. The at least two sinusoidal waveforms may be phase-shifted with respect to each other, giving rise to a further extended number of possible periodic waveforms, with a correspondingly extended marker code. The at least two sinusoidal waveforms may have different periodicities and/or amplitudes with respect to each other, giving rise to a further extended number of possible periodic waveforms, with a correspondingly extended marker code.

Other types of periodic waveforms than sinusoidal waveforms may be chosen to define line segments.

Figure 2A:
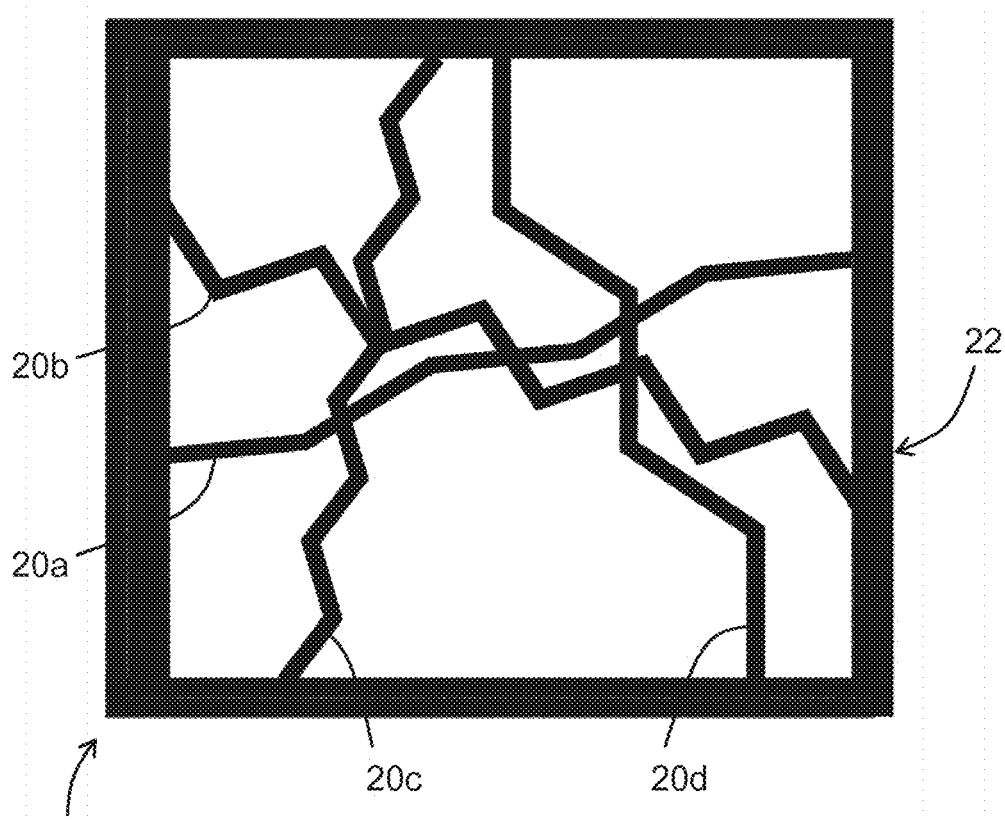
FIG. 2a depicts another embodiment of a marker according to the invention, comprising line segments representing triangular waveforms having different amplitudes and different periodicities.

FIG. 2a shows a marker 20 comprising line segments 20a, 20b, 20c, 20d all having a shape of a periodic waveform being a triangular waveform. The line segments 20a, 20b, 20c and 20d are situated within the boundaries of an edge line 22 having a rectangular shape.

Figure 2B:
FIGS. 2b to 2d respectively depict shapes of line segments having a triangular waveform and having different amplitudes and different periodicities.

As shown in FIG. 2b, a line segment 10a may have a triangular shape having a first periodicity and a first amplitude.

Figure 2C:
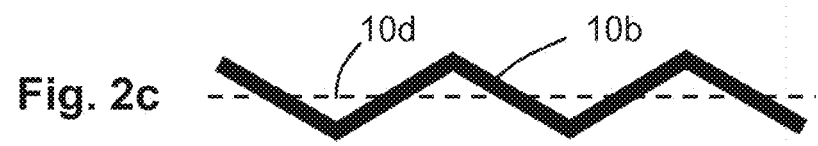

As shown in FIG. 2c, another line segment 10b having a triangular shape may have a second periodicity greater than the first periodicity of line segment 10a, and a second amplitude greater than the first amplitude of line segment 10a. An imaginary straight reference line 10d relative to which a periodicity and amplitude of the line segment 10b can be determined, such as by measuring a distance or length, is indicated as a dashed line.

Figure 2D:
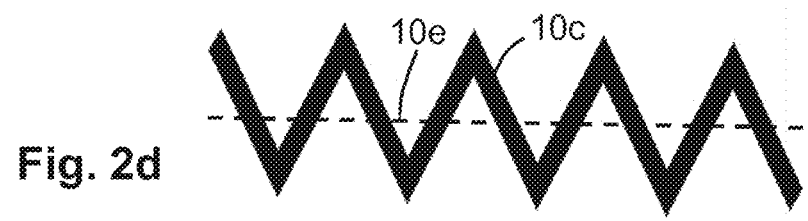

As shown in FIG. 2d, another line segment 10c having a triangular shape may have the first periodicity of line segment 10a, and a third amplitude greater than the first amplitude of line segment 10a, and greater than the second amplitude of line segment 10b. An imaginary straight reference line 10e relative to which a periodicity and amplitude of the lined segment 10c can be determined, such as by measuring a distance or length, is indicated as a dashed line.

Figure 3A:
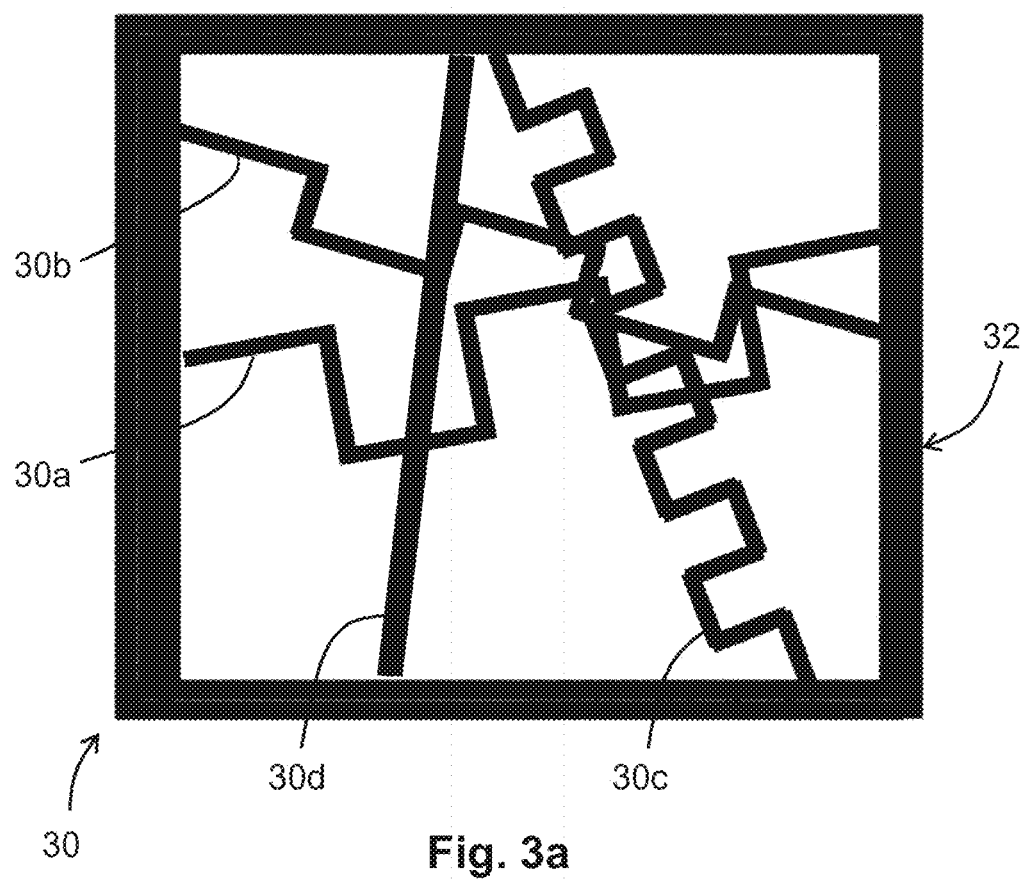
FIG. 3a depicts another embodiment of a marker according to the invention, comprising line segments representing rectangular waveforms having different amplitudes and different periodicities.

FIG. 3a shows a marker 30 comprising line segments 30a, 30b, 30c all having a shape of a periodic waveform being a rectangular waveform. Line segment 30d is a straight line. The line segments 30a, 30b, 30c and 30d are situated within the boundaries of an edge line 32 having a rectangular shape.

Figure 3B:
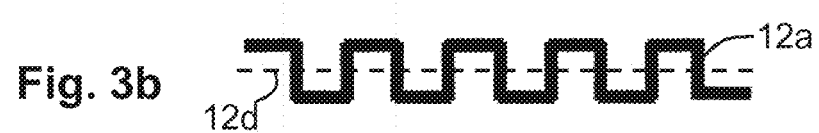
FIGS. 3b to 3d respectively depict shapes of line segments having a rectangular waveform and having different amplitudes and different periodicities.

As shown in FIG. 3b, a line segment 12a may have a rectangular shape having a first periodicity and a first amplitude. An imaginary straight reference line 12d relative to which a periodicity and amplitude of the lined segment 12a can be determined, such as by measuring a distance or length, is indicated as a dashed line.

Figure 3C:
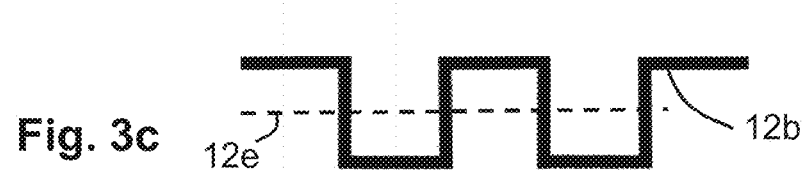

As shown in FIG. 3c, another line segment 12b having a rectangular shape may have a second periodicity greater than the first periodicity of line segment 12a, and a second amplitude greater than the first amplitude of line segment 12a. An imaginary straight reference line 12e relative to which a periodicity and amplitude of the lined segment 12b can be determined, such as by measuring a distance or length, is indicated as a dashed line.

Figure 3D:
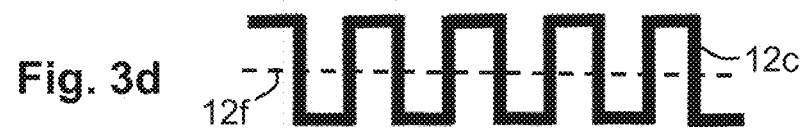

As shown in FIG. 3d, another line segment 12c having a rectangular shape may have the first periodicity of line segment 12a, and the second amplitude of line segment 12b greater than the first amplitude of line segment 12a. An imaginary straight reference line 12f relative to which a periodicity and amplitude of the lined segment 12c can be determined, such as by measuring a distance or length, is indicated as a dashed line.

FIG. 4a shows a marker 40 comprising line segments 40a, 40b, 40c all comprising a shape of a periodic waveform being a sinusoidal waveform, and further comprising straight line parts. Line segment 40d is a straight line. The line segments 40a, 40b, 40c and 40d are situated within the boundaries of an edge line 42 having a rectangular shape.

As shown in FIG. 4b, a line segment 14a may have a first straight line part 16a, a sinusoidal part 16b, and a second straight line part 16c. The straight line parts 16a, 16c may be considered to lie on an imaginary straight reference line 16f, as indicated by a dashed line. A transition 16d between the first straight line part 16a and the sinusoidal part 16b may indicate a first phase angle of 90 degrees for the line segment 14a. A transition 16e between the sinusoidal part 16b and the second straight line part 16c may indicate a second phase angle of 90 degrees for the line segment 14a. The sinusoidal line part 16b has a first periodicity along the reference line 16f (a distance or length between the transitions 16d, 16e), and a first amplitude with respect to the reference line 16f (a length of any one of the transitions 16d, 16e).

As shown in FIG. 4c, another line segment 14b may have a first straight line part 18a, a sinusoidal part 18b, and a second straight line part 18c. A transition 18d between the first straight line part 18a and the sinusoidal part 18b may indicate a first phase angle of 120 degrees for the line segment 14b. A transition 18e between the sinusoidal part 18b and the second straight line part 18c may indicate a second phase angle of 300 degrees for the line segment 14b. The sinusoidal line part 18b has a second periodicity smaller than the first periodicity of line segment 14a, and a second amplitude smaller than the first amplitude of line segment 14a.

As shown in FIG. 4d, another line segment 14c may have a first straight line part 19a, a sinusoidal part 19b, and a second straight line part 19c. The straight line parts 19a, 19c may be considered to lie on an imaginary straight reference line 19f, as indicated by a dashed line. A transition 19d between the first straight line part 19a and the sinusoidal part 19b may indicate a first phase angle of 180 degrees for the line segment 14c. A transition 19e between the sinusoidal part 19b and the second straight line part 19c may indicate a second phase angle of 180 degrees for the line segment 14c. The sinusoidal line part 19b has a third periodicity along the reference line 19f (a distance or length between the transitions 19d, 19e), smaller than the first periodicity of line segment 14a, and smaller than the second periodicity of line segment 14b, and has a third amplitude with respect to the reference line 19f smaller than the first amplitude of line segment 14a, and greater than the second amplitude of line segment 14b.

Accordingly, in addition to first end points, second end points, periodicity and amplitude, also phase angles may characterize line segments. Thus, a marker code may be further extended by including code segments representing phase angles of line segments.

Figure 5A:
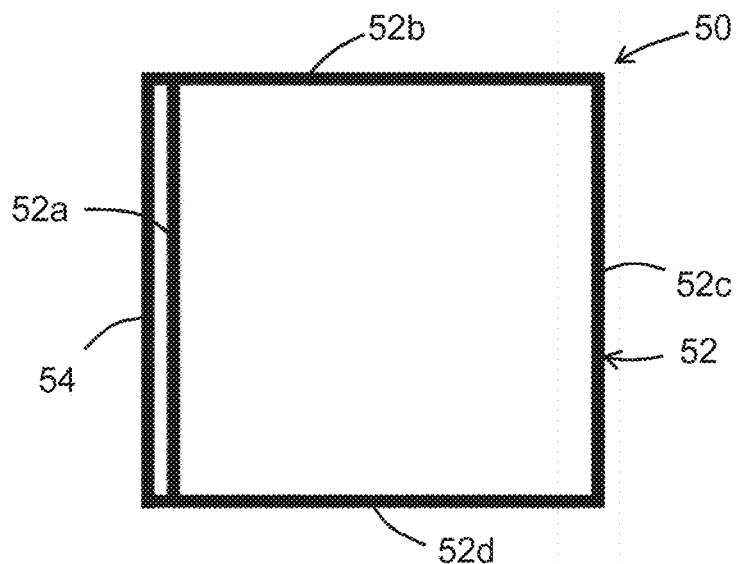
FIGS. 5a and 5b respectively depict combinations of an edge line and a home line segment.

FIG. 5a shows a marker 50 having an edge line 52 including edge line segments 52a, 52b, 52c and 52d. Edge line segment 52a is combined with a home line segment 54 being a straight line segment. The home line segment 54 allows to establish an orientation of the marker 50 when scanning the marker 50.

Figure 5B:
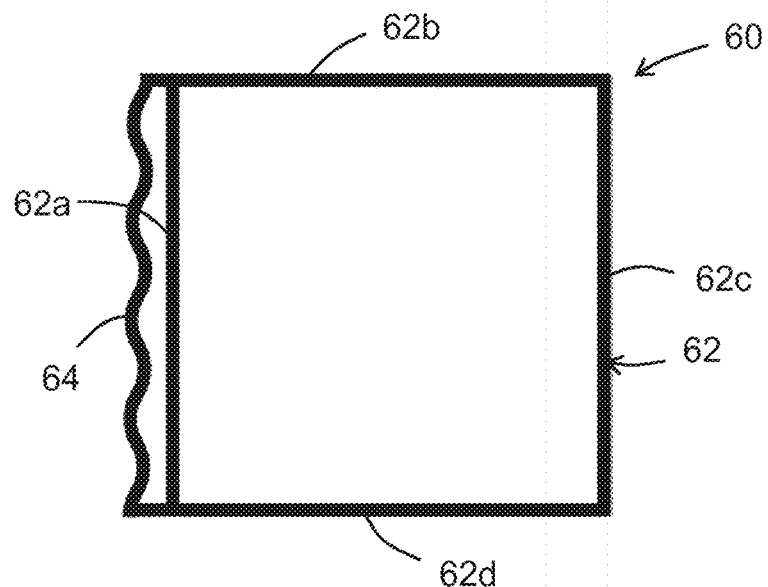

FIG. 5b shows a marker 60 having an edge line 62 including edge line segments 62a, 62b, 62c and 62d. Edge line segment 62a is combined with a home line segment 64 being a sinusoidal line segment. The home line segment 64 allows to establish an orientation of the marker 60 when scanning the marker 60. In addition, the home line segment 64 may have a specific periodicity, a specific amplitude, and even a specific phase angle, as defined at at least one of the end points of the home line segment 64, such that the home line segment 64 may serve as a further line segment to store coded information in the marker 60.

With a marker associated with an object, object data corresponding to the object can be associated with the object. Based on the object data, a marker may be generated as follows.

Figure 6:
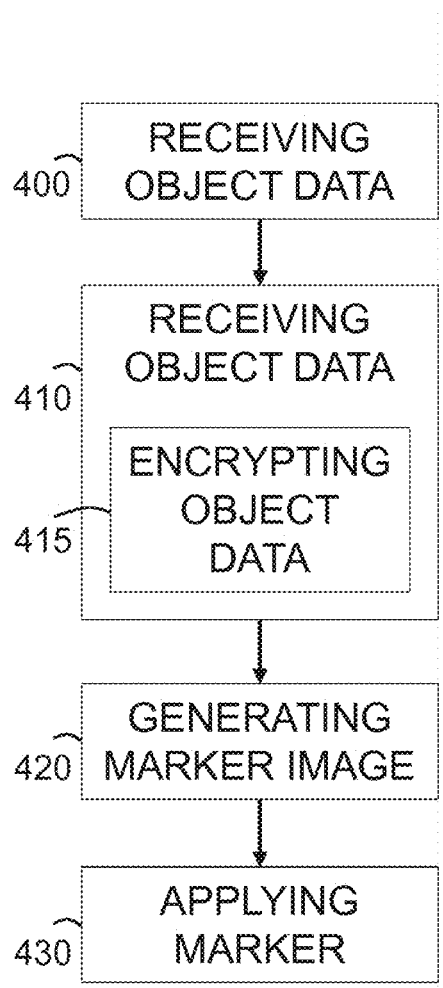
FIG. 6 depicts a flow diagram illustrating method steps of generating a marker to be associated with an object.
Figure 7:
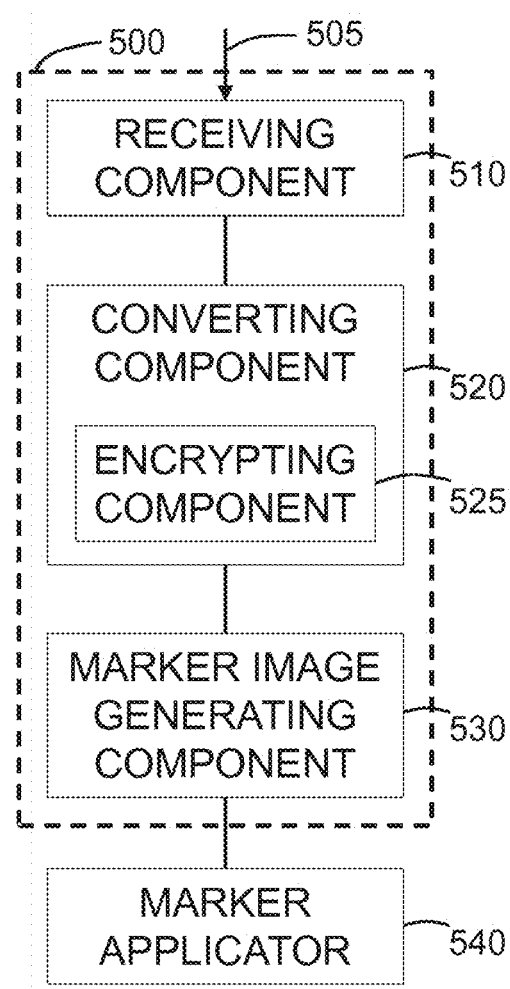
FIG. 7 depicts a block diagram schematically indicating components of a data processing system for generating a marker.

As illustrated in the flow diagram of FIG. 6, and the block diagram of FIG. 7, according to a method step 400 object data characterizing the object are received in a data processing system 500, indicated by a dashed line. Such object data, comprising at least one of object identification data, e.g. a serial number, and object manufacturing data, e.g. date, time and location, may be collected and stored in, or transferred or transmitted to the data processing system 500. For this purpose, the data processing system comprises a receiving component 510 configured for receiving the object data corresponding to the object, as indicated by arrow 505.

Herein, the term 'component' refers to combined hardware and software functionality, i.e. a hardware processing component (such as a processor) configured to load and/or store software comprising instructions for performing a specific function or method step as described.

As illustrated at step 410, following step 400, the object data are converted into a marker code. For this purpose, the data processing system 500 comprises a converting component 520 configured for converting the object data into the marker code.

As illustrated at step 415, during step 410, the object data may be encrypted to obtain an encrypted marker code. For this purpose, the data processing system 500 may comprise an encrypting component 525 configured for encrypting the object data to obtain the encrypted marker code.

As illustrated at step 420, following step 410, a marker image is generated by a marker image generating component 530, based on the marker code, or encrypted marker code. In this generating process, predefined marker code/marker relationship rules may be applied, for example using look-up tables.

As illustrated at step 430, following step 420, the marker is applied to an object or a marker support to be connected to the object, based on the marker image. For this purpose, the processing system 500 is coupled to a marker applicator 540 configured for applying the marker on or in an object, or a marker support to be connected to the object. The marker applicator 540 may comprise a printer, such as a laser printer or inkjet printer, for printing the marker on the object, or on an associated marker support to be connected to the object. In another embodiment, the marker applicator 540 may comprise an engraving device for engraving the marker on or in the object, or an associated marker support to be connected to the object.

The object data, the marker code, the marker image and the marker have a one-to-one relationship.

The data processing system 500 may be physically integrated in a single device, optionally including the marker applicator 540 or not, or may be physically distributed across different devices. For example, receiving component 510 may be operative at another location than the other components 520, 525, 530. In other embodiments, the receiving component 510 and converting component 520, possibly including the encrypting component 525, may be operative at another location than the other component 530. Data communication between different components may be within the physically integrated single device, or may be through data communication lines, possibly in a network such as the Internet, in case of physically distributed devices. Data communication may be wired or wireless.

With a marker associated with an object, object data corresponding to the object can be associated with the object. Based on the marker, object data may be generated as follows.

Figure 8:
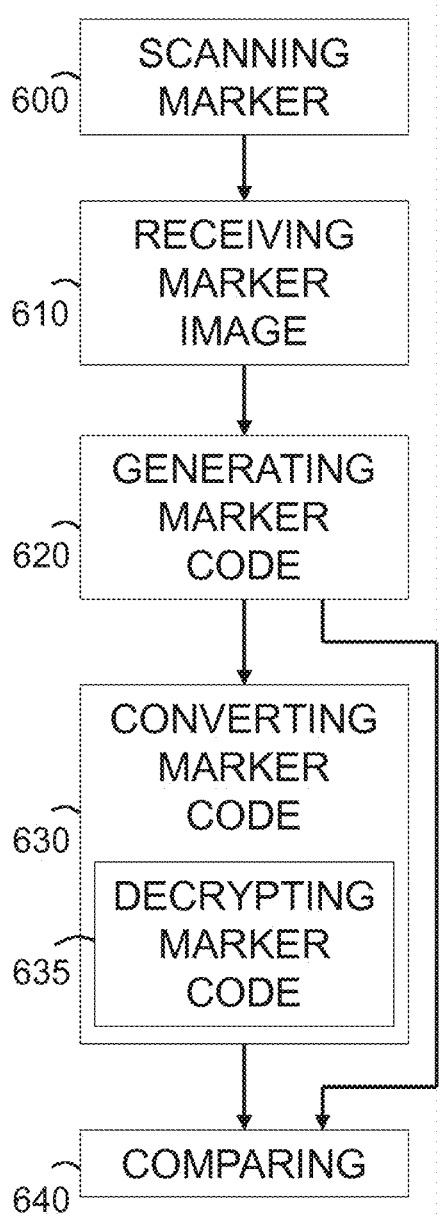
FIG. 8 depicts a flow diagram illustrating method steps of generating object data to be associated with a marker.
Figure 9:
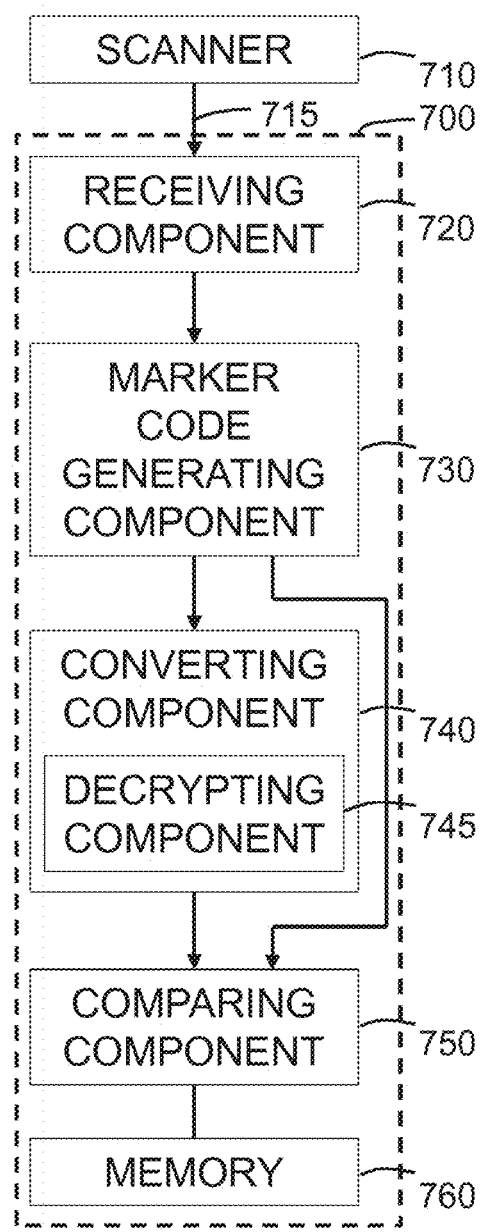
FIG. 9 depicts a block diagram schematically indicating components of a data processing system for generating object data.

As illustrated in the flow diagram of FIG. 8, and the block diagram of FIG. 9, according to a method step 610 a marker image is received in a data processing system 700, indicated by a dashed line. The marker image is obtained by scanning the marker according to step 600, using a scanner 710, such as an optical scanner, coupled to the data processing system 700, in particular to a receiving component 720 configured for receiving, as indicated by arrow 715, a marker image obtained by scanning the marker.

As illustrated at step 620, following step 610, a marker code is generated based on the marker image. For this purpose, the data processing system 700 comprises a marker code generating component 730 configured for generating a marker code based on the marker image. The marker code generating component 730 may comprise image recognition software configured to recognize properties of line segments of a marker. Line segments may have one or more properties selected from a group of properties comprising: a first end point of the line segment; a second end point of the line segment; a periodicity of at least part of the line segment; an amplitude of at least part of the line segment; and a phase angle of at least a part of the line segment. The properties are represented in sections of the marker code, as explained above.

In the marker code generating process 620, predefined marker code/marker relationship rules may be applied, for example using look-up tables.

As illustrated at step 630, following step 620, the marker code is converted into object data. For this purpose, the data processing system 700 comprises a converting component 740 configured for converting the marker code into object data.

As illustrated at step 635, during step 630, the marker code, if it is an encrypted marker code, may be decrypted to obtain an (decrypted) marker code. For this purpose, the data processing system 700 comprises a decrypting component 745 configured for decrypting the encrypted marker code.

As illustrated at step 640, the generated marker code obtained in step 620 may be compared with each one of a set of authenticated marker codes and, if the generated marker code is found to be identical to one of the authenticated marker codes, the object is designated as being identified and/or authentic. For this purpose, the data processing system 700 may comprise a comparing component 750 configured for comparing the generated marker code with each one of a set of authenticated marker codes, and further configured, if the generated marker code is found to be identical to one of the authenticated marker codes, for designating the object as being authentic. The authenticated marker codes may be stored in a memory 760 of the data processing system 700, or may be stored at another location and retrieved by the data processing system 700. Alternatively, in step 640 at least part of the object data obtained in step 630 may be compared with each one of a set of authenticated object data and, if the at least part of the object data is found to be identical to one of the authenticated object data, the object is designated as being identified and/or authentic. For this purpose, the data processing system 700 may comprise a comparing component 750 configured for comparing at least part of the object data with each one of a set of authenticated object data and further configured, if the at least part of the object data is found to be identical to one of the authenticated object data, for designating the object as being identified and/or authentic. The authenticated object data may be stored in the memory 760 of the data processing system 700, or may be stored at another location and retrieved by the data processing system 700.

The object data, the marker code, the marker image and the marker have a one-to-one relationship.

The data processing system 700 may be physically integrated in a single device, optionally including the scanner 710 or not, or may be physically distributed across different devices. For example, receiving component 720 may be operative at another location than the other components 730, 740, 750. In other embodiments, for example the receiving component 720 and marker code generating component 730 may be operative at another location than the converting component 740, possibly including the decrypting component 745. Data communication between different components may be within the physically integrated single device, or may be through data communication lines, possibly in a network such as the Internet, in case of physically distributed devices. Data communication may be wired or wireless.

As explained above, a two-dimensional marker for marking an object comprises a plurality of line segments each extending between a first end point and a second end point thereof, wherein at least one of the line segments comprises a shape of at least one period of a periodic waveform.

The marker of the present invention may be used to identify and/or authenticate, track and trace many different products, such as airbags, apparel, appliances, auto parts including brakes, batteries, bearings, consumables, contact lenses, cosmetics, circuit breakers, documents, electronics, jewelry, medical devices, pharmaceuticals, original and spare parts, watches, etc.

The marker of the present invention may be combined with another type of marker, and thus may provide a two-factor product authentication. By providing the marker for example alongside other open source tracking technologies like barcode, Datamatrix or QR-code it is possible to deliver two-factor authentication, 2FA, for products in a similar way as a text message provides a second factor of authentication for email or bank account login. If the information in the marker is able to be compared with the information in the open source tracking technology, a more secure determination can be made on the authenticity of a product. In this way the marker can be used to enhance the security of existing products and solutions.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Further, the terms and phrases used herein are not intended to be limiting, but rather, to provide an understandable description of the invention.

The terms "a"/"an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly, and not necessarily mechanically.

A single processor or other unit may fulfill the functions of several items recited in the claims.

The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system, or data processing system.

A computer program may be stored and/or distributed on a suitable medium, such as an optical storage medium or a solid-state medium supplied together with or as part of other hardware, but also be distributed in other forms, such as via the Internet or other wired or wireless telecommunication systems.

The invention claimed is:

1. A two-dimensional marker for marking an object, the marker comprising a plurality of line segments each extending between a first end point and a second end point thereof, wherein at least one of the line segments comprises a shape of at least one period of a periodic waveform.

2. The marker according to claim 1, wherein the periodic waveform is one of a sinusoidal waveform, a square waveform or a triangular waveform.

3. The marker according to claim 1, wherein the periodic waveform is a compounded waveform comprising an addition of at least two sinusoidal waveforms.

4. The marker according to claim 3, wherein the at least two sinusoidal waveforms are phase-shifted with respect to each other.

5. The marker according to claim 3, wherein the at least two sinusoidal waveforms have different amplitudes with respect to each other.

6. The marker according to claim 3, wherein the at least two sinusoidal waveforms have different periodicities with respect to each other.

7. The marker according to claim 1, wherein the at least one line segment comprising a shape of at least a period of a periodic waveform is associated with a periodicity being one of a plurality of periodicities, comprising at least a first periodicity and a second periodicity being different from each other.

8. The marker according to claim 1, wherein the at least one line segment comprising a shape of at least a period of a periodic waveform is associated with an amplitude being one of a plurality of amplitudes, comprising a least a first amplitude and a second amplitude being different from each other.

9. The marker according to claim 1, wherein the at least one line segment comprising a shape of at least a period of a periodic waveform is associated with a phase angle being one of a plurality of phase angles, comprising a least a first phase angle and a second phase angle being different from each other.

10. The marker according to claim 1, wherein the first end points and the second end points of the line segments are located on an edge line comprising at least one edge line segment.

11. The marker according to claim 10, wherein the edge line has a shape which is one of:
   a rounded shape, or
   a polygon shape, wherein an edge line segment is a side of the polygon shape.

12. The marker according to claim 10, comprising an edge line segment having a line width being different from another edge line segment.

13. The marker according to claim 1, wherein the marker comprises at least a part of a substrate provided with the plurality of line segments.

14. A data processing system for generating a marker, wherein the marker is to be associated with an object, the data processing system comprising:
   at least one processor configured to load software comprising instructions for performing the steps of:
   receiving object data corresponding to the object;
   converting the object data into a marker code;
   generating a marker image based on the marker code, wherein the marker is based on the marker image, and comprises a plurality of line segments each extending between a first end point and a second end point thereof, wherein at least one of the line segments comprises a shape of at least one period of a periodic waveform,
   wherein the object data, the marker code, the marker image and the marker have a one-to-one relationship.

15. The data processing system according to claim 14, wherein the marker code comprises a plurality of marker code segments each defining a property of a line segment, based on predefined relationships between variations in marker code segments and variations in properties of line segments, and wherein the property of a line segment is selected from a group of properties comprising:
   a first end point of the line segment;
   a second end point of the line segment;
   a periodicity of at least part of the line segment;
   an amplitude of at least part of the line segment; and
   a phase angle of at least a part of the line segment.

16. The data processing system according to claim 14, further comprising a printer for printing the marker on the object, or a marker support to be connected to the object.

17. The data processing system according to claim 14, further comprising an engraving device for engraving the marker on or in the object, or a marker support to be connected to the object.

18. A data processing system for generating object data corresponding to an object being associated with a marker, the data processing system comprising:
   at least one processor configured to load software comprising instructions for performing the steps of:
   receiving a marker image obtained by scanning the marker, wherein the marker comprises a plurality of line segments each extending between a first end point and a second end point thereof, wherein at least one of the line segments comprises a shape of at least one period of a periodic waveform;

generating a marker code based on the marker image; and converting the marker code into object data, wherein the object data, the marker code, the marker image and the marker have a one-to-one relationship.

19. A data processing system for identifying and/or authenticating an object, the object being associated with a marker, the data processing system comprising:

at least one processor configured to load software comprising instructions for performing the steps of:

receiving a marker image obtained by scanning the marker, wherein the marker comprises a plurality of line segments each extending between a first end point and a second end point thereof, wherein at least one of the line segments comprises a shape of at least one period of a periodic waveform;

generating a marker code based on the marker image, wherein the marker code, the marker image, and the marker have a one-to-one relationship; and comparing the generated marker code with each one of a set of authenticated marker codes, and, if the generated marker code is found to be identical to one of the authenticated marker codes, designating the object as being authentic.

20. A data processing system of identifying and/or authenticating an object, the object being associated with a marker, the data processing system comprising:

at least one processor configured to load software comprising instructions for performing the steps of:

receiving a marker image obtained by scanning the marker, wherein the marker comprises a plurality of line segments each extending between a first end point and a second end point thereof, wherein at least one of the line segments comprises a shape of at least one period of a periodic waveform;

generating a marker code based on the marker image;

converting the marker code into object data, wherein the object data, the marker code, the marker image and the marker have a one-to-one relationship; and comparing at least part of the object data with each one of a set of authenticated object data and, if the at least part of the object data is found to be identical to one of the authenticated object data, for designating the object as being identified and/or authentic.

* * * * *